Sept. 16, 1930.  A. P. ROSE  1,775,736
ROPE SADDLE
Filed Oct. 3, 1929

Inventor
A. P. Rose
By Harry Frease
Attorney

Patented Sept. 16, 1930

1,775,736

UNITED STATES PATENT OFFICE

ALMOND P. ROSE, OF PAINESVILLE, OHIO, ASSIGNOR TO NELSON & KUEMMERLING, INC., OF CANTON, OHIO, A CORPORATION OF OHIO

ROPE SADDLE

Application filed October 3, 1929. Serial No. 397,036.

My invention relates to rope saddles more particularly for use by tree trimmers for suspending themselves beside the trees being trimmed.

Aside from the trimming of trees for ornamental purposes or for maintaining the health of the trees, it is becoming more and more necessary to trim trees near electric power lines, telephone wires and cables and trolley wires and supporting cables in order to prevent rubbing of the tree branches against these electrical conductors and their supports.

Unless such rubbing is prevented, short circuits may result, and the wires and cables may be rubbed through and broken, resulting in an interruption of service in the light, telephone or trolley system, and also frequently resulting in accident and loss of life due to the contact of short circuited or broken wires with persons unfamiliar with the proper handling of the same.

The trimming of trees for such purposes gives rise to greater hazards than ordinary tree trimming, and it is necessary to provide some means of support for the trimmers by which they may position themselves adjacent the portion of the trees being trimmed, and which at the same time reduces the danger of shock to minimum.

In order to provide for the free use of both arms and both legs of a tree trimmer, various forms of suspended rope saddles or slings have been proposed, but have been unsatisfactory, either because they could not be easily adjusted to fit tree trimmers of different sizes, or because of splices in the ropes used becoming unfastened and thereby dropping the trimmer seated in the saddle.

The objects of the present improvements include the provision of an improved rope saddle adapted to be suspended from any suitable support adjacent a tree being trimmed or the like, and which is adjustable for fitting persons of various sizes and which does not include any splices in the rope member of the saddle intermediate its ends.

These and other objects are attained by the present improvements as will hereinafter be set forth in greater detail, and claimed.

Figure 2:
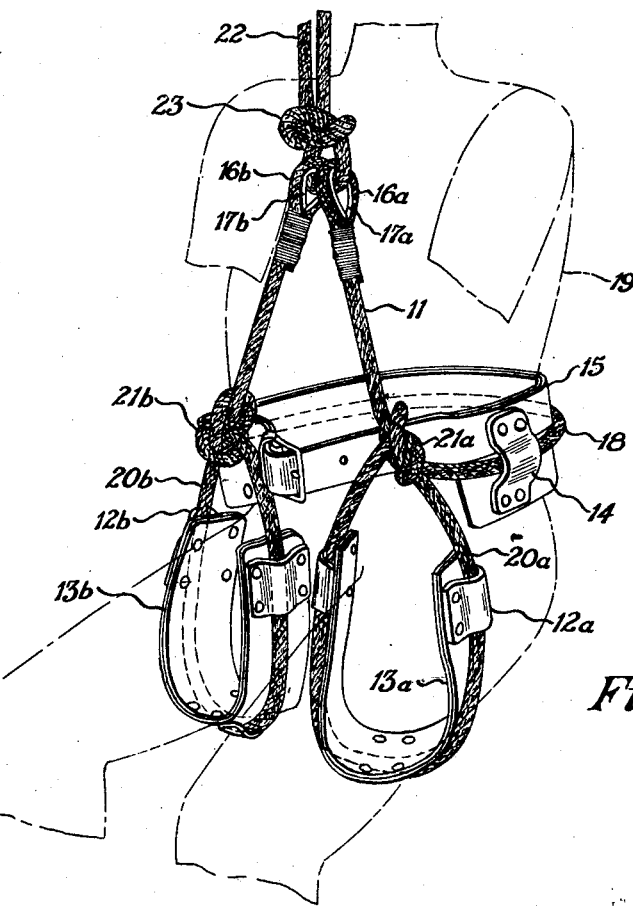
Figure 1:
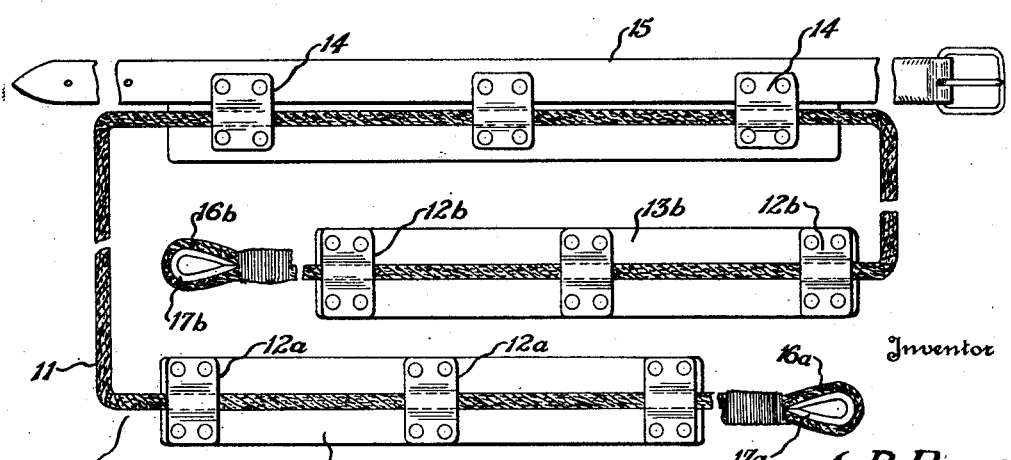

A preferred embodiment of the invention is illustrated in the accompanying drawing forming part hereof, in which Figure 1 is a fragmentary detached view of the improved rope saddle; and Fig. 2, a perspective view of the saddle in use, a fragmentary body of a person supported by the saddle being indicated in dot and dash lines.

Similar numerals refer to similar parts throughout the drawing.

The improved rope saddle indicated generally at 10, includes a single length of rope 11, which preferably passes through spaced sleeves $12^a$ secured upon a thigh strap $13^a$ thence through spaced sleeves 14 secured on a waist belt 15 and thence through spaced sleeves $12^b$ secured on another thigh strap $13^b$.

An eye loop $16^a$ is formed at one extremity of the rope 11 and is preferably reinforced with a metallic eye loop liner $17^a$; and similarly an eye loop $16^b$ is formed at the other extremity of the rope 11 and is preferably reinforced with a metallic eye loop liner $17^b$.

The single rope 11 is knotted as illustrated in Fig. 2 to form in its central portion a waist yoke 18, which passes through the loops 14 of the waist belt 15, which is arranged for buckling about the waist of the person using the saddle, as indicated in dot and dash lines at 19 in Fig. 2.

At one end of the central portion 18, the rope 11 is arranged to form one thigh supporting loop $20^a$ which is reinforced by the thigh strap $13^a$, the loop being formed by looping and knotting the portion of the rope between one end sleeve 14 of the belt 15 and the eye loop $16^a$. The knot used is preferably as illustrated a modified square or reef knot $21^a$ which is similar to a usual square or reef knot in the arrangement of the rope at the knot, and in which the thigh loop $20^a$ corresponds to the configuration which would be obtained by joining the ordinarily separate rope ends at one side of the knot.

Similarly at the other end of the central portion 18, the rope 11 is arranged to form another thigh supporting loop $20^b$ which is reinforced by the thigh strap $13^b$, the loop being formed by looping and knotting the portion of the rope between the other end sleeve 14 of the belt 15 and the eye loop 16$^b$. The knot used is preferably as illustrated a modified square or reef knot 21$^b$ which is similar to a usual square or reef knot in the arrangement of the rope at the knot, and in which the thigh loop 20$^b$ corresponds to the configuration which would be obtained by joining the ordinarily separate rope ends at one side of the knot.

In use, the saddle is arranged as illustrated in Fig. 2, the belt 15 being buckled about the waist of the person using the saddle, and the thigh loops being adjusted for properly fitting the user's thighs; and the eye loops 16$^a$ and 16$^b$ are joined to the end of a suspending rope or cable 22 by any suitable hitch or knot 23.

Accordingly the improved rope saddle includes a single rope knotted and looped to form a waist yoke and adjustable thigh loops, and there are no splices in the rope to form the thigh loops; and a safe as well as adaptable rope saddle is thus provided.

While it is preferred to use a single length of rope in making the saddle, it is obvious that a length of any flexible material may be utilized in forming the saddle.

I claim:

1. A saddle including a single length of flexible material knotted and looped on itself, and including a waist yoke and two separate thigh loops intermediate the ends of the material.

2. A saddle including a single length of flexible material, square knots and loops formed in the flexible material intermediate its ends, each loop being formed by a portion of the flexible material comprising one side of each knot.

3. A saddle including a single length of flexible material knotted and looped, and including a waist yoke and thigh loops intermediate the ends of the material, and a waist belt connected with the waist yoke.

4. A saddle including a single length of flexible material, square knots and loops formed in the flexible material intermediate its ends, each loop being formed by a portion of the flexible material comprising one side of each knot, and a waist belt connected to the central portion of the flexible material between loops.

In testimony that I claim the above, I have hereunto subscribed my name.

ALMOND P. ROSE.